United States Patent [19]
Keeler et al.

[11] Patent Number: 5,568,544
[45] Date of Patent: Oct. 22, 1996

[54] ROUTING INCOMING CALLS TO A PBX IN RESPONSE TO ROUTE REQUESTS FROM A HOST COMPUTER

[75] Inventors: Thomas C. Keeler, La Crosse, Wis.; Loanne P. Dang, Raleigh, N.C.; Chuck S. Kelly, San Jose, Calif.

[73] Assignee: Siemens Rolm Communications Inc., Santa Clara, Calif.

[21] Appl. No.: 402,686

[22] Filed: Mar. 13, 1995

[51] Int. Cl.$^6$ .............................. H04M 3/00; H04M 7/00; H04Q 3/64
[52] U.S. Cl. .......................... 379/273; 379/221; 379/225; 379/265; 379/309
[58] Field of Search ...................................... 379/229, 231, 379/232, 233, 242, 243, 244, 258, 265, 266, 268, 269, 309, 273, 284, 45, 219, 220, 221, 224, 225, 272

[56] References Cited

U.S. PATENT DOCUMENTS 5,249,223  9/1993  Vanacore .............................. 379/45 X Primary Examiner—Krista M. Zele
Assistant Examiner—Harry S. Hong

[57] ABSTRACT

An embodiment of the present invention is a method for dynamically routing incoming calls through a private branch exchange (PBX) in response to commands issued by a host computer and, in particular, for routing incoming calls after routing information has been obtained from conventional ACD call handling techniques. In particular, an embodiment of the present invention is a method for dynamically routing incoming calls through a private branch exchange (PBX), which method comprises the steps of: (a) receiving an incoming call; (b) requesting a route request from a call processing module of the PBX, the route request being referred to as an internal route request; (c) receiving a route request for the incoming call from an alternate source, the route request being referred to as an external route request; and (d) rejecting the internal or the external route request on the basis of a priority scheme.

7 Claims, 1 Drawing Sheet

5,568,544

1

ROUTING INCOMING CALLS TO A PBX IN RESPONSE TO ROUTE REQUESTS FROM A HOST COMPUTER

TECHNICAL FIELD OF THE INVENTION

The present invention relates to the field of telecommunications, and more particularly, to a method for routing incoming calls through a private branch exchange (PBX).

BACKGROUND OF THE INVENTION

A private branch exchange (PBX) is a telephone communications system generally used by large businesses for interconnecting all classes of trunk lines, station lines and other lines. The PBX concentrates signals on the trunk lines for subsequent transmission to a network of private stations. A conventional PBX includes a switching unit (SWU) which is comprised of call processing software (CP). The CP typically includes call handling and device handling software modules which monitor and interconnect incoming calls and devices. The CP of a conventional PBX typically includes automatic call distribution software (ACD) and ACD Routing Tables, which ACD software automatically routes incoming calls to preassigned destinations in order to maximize call-answering productivity.

To provide greater versatility and functionality, many modern PBXs further comprise one or more server processors which are coupled to the CP of the PBX SWU. The server processors provide a link for communication between the CP and host computers which are external to the PBX. In particular, the link to the external host computers enables a host computer, such as an IBM PC, to monitor the operation of one or more PBXs (i.e. by monitoring call routing and call status information) through the execution of host-specific software applications. In some modern PBXs, a host-specific software application provides limited routing of an incoming call by the host computer during a short time interval which starts when the incoming call is received and ends when the incoming call is handled in accordance with conventional ACD call handling techniques (ACDCHT). This is useful in that it provides the flexibility of routing an incoming call (under control of the CP) to an ACD of another PBX when the ACD of the first PBX is too congested.

To provide the above-described flexibility of routing an incoming call by a host computer in a conventional PBX, the CP in the conventional PBX delays incoming calls for a predetermined amount of time (delay interval) before it requests routing to the ACD software. The resulting delay interval provides a window of inactivity during which a host computer which monitors the first PBX can determine whether the incoming call should be routed to another PBX based on the current call status information the host computer has received from the PBX. If the incoming call is not routed elsewhere, it is handled in accordance with conventional ACD call handling techniques.

While the prior art method of routing incoming calls to an ACD on an alternate PBX in response to commands from an external host computer is useful in reducing ACD congestion, a significant drawback with the prior art method is that the host computer is permitted to route the incoming call only during the short time interval described above. After the time interval ends, subsequent routing of the incoming call is determined solely in accordance with the ACDCHT, which ACDCHT includes use of ACD Routing Tables. As is well known, reconfiguration of the ACD Routing Tables is

2 static, i.e., it can be performed manually at predetermined times and cannot be performed individually for each incoming call so that the incoming call is routed to an optimal destination.

As one can readily appreciate from the above, a major disadvantage with the prior art routing method is that a host computer may not be able to make a timely decision concerning the propel routing destination for an incoming call before it is transferred to the ACDCHT. This may occur when, for example, the network rules do not provide the host computer with sufficient time to make an optimal routing decision and to transmit the associated commands to the PBX. One result of this is that if the ACD at the PBX is congested, the incoming call may be connected to a recording for a prolonged period of time, thereby causing the caller to terminate the call.

In light of the above, there is a need for a method for dynamically routing incoming calls to a PBX in response to commands issued by a host computer and, in particular, for routing incoming calls after a routing request has been obtained from the ACDCHT.

SUMMARY OF THE INVENTION

Advantageously, an embodiment of the present invention provides a method for dynamically routing incoming calls through a private branch exchange (PBX). Embodiments of the present invention are advantageous in that they provide the host computer with sufficient time to monitor the progress of incoming calls and to make routing decisions that will optimize operation of the PBX.

An embodiment of the present invention is a method for dynamically routing incoming calls through a private branch exchange (PBX), which method comprises the steps of: (a) receiving an incoming call; (b) requesting a route request from a call processing module of the PBX, the route request being referred to as an internal route request; (c) receiving a route request for the incoming call from an alternate source, the route request being referred to as an external route request; and (d) rejecting the internal or the external route request on the basis of a priority scheme.

DETAILED DESCRIPTION

Figure 1:
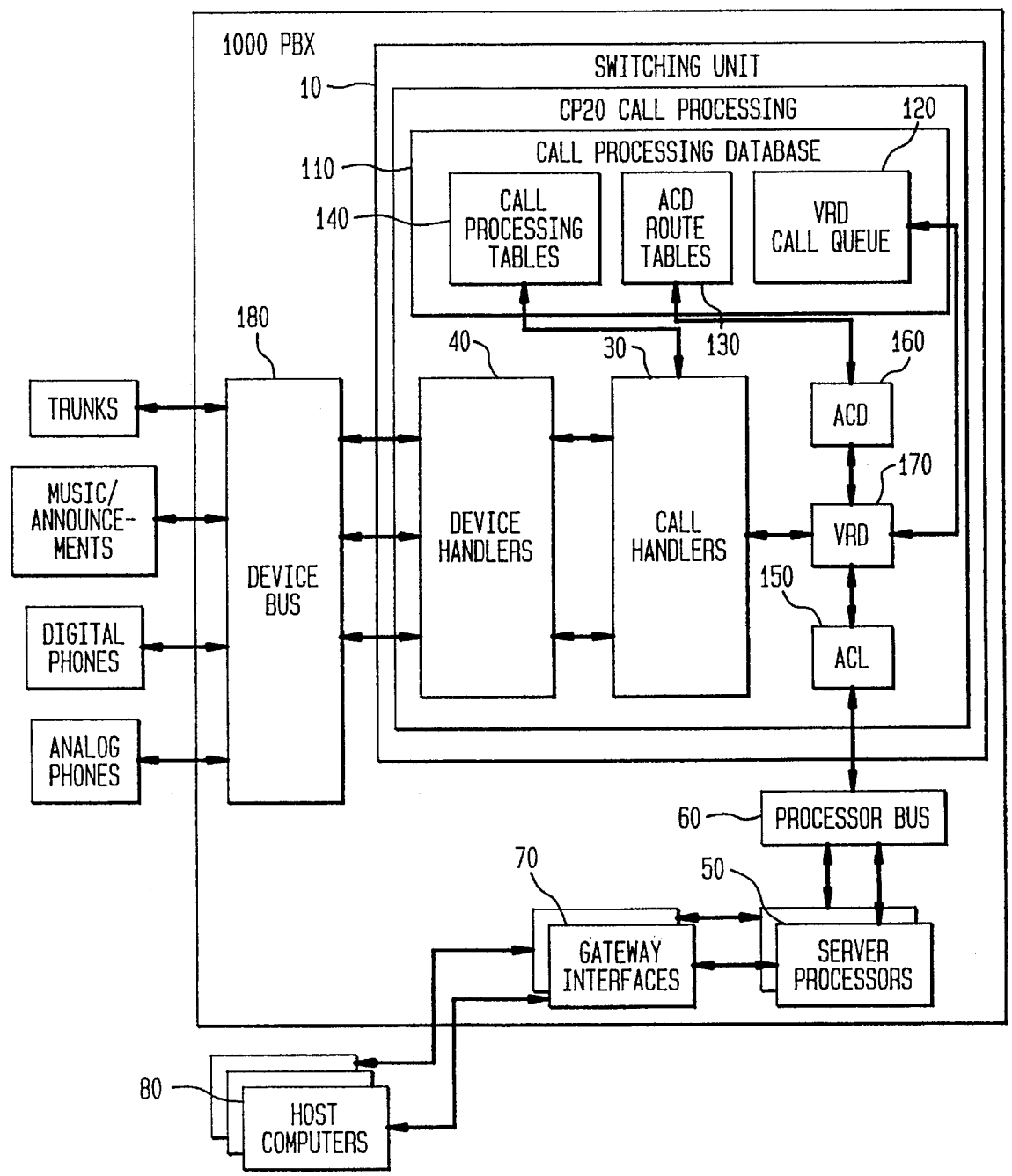
FIG. 1 shows a block diagram of a PBX which operates in accordance with the present invention.

FIG. 1 shows a block diagram of private branch exchange 1000 (PBX 1000) which operates in accordance with the present invention. As shown in FIG. 1, PBX 1000 comprises switching unit 10 (SWU 10) which includes call processing software 20 (CP 20) and call processing data base 110 (CPDB 110). CP 20 is software which monitors incoming calls and controls switching of lines between incoming calls, outgoing calls and devices such as a recording device. CPDB 110 is a dam base that supports the activities of CP 20.

An incoming call received by PBX 1000 is connected to device bus 180. Information related to the incoming call is forwarded from device bus 180 by a software module of CP 20, denoted as device handler 40, to a software module of CP 20, denoted as call handler 30. Call handler 30 forwards the incoming call to a software module of CP 20, denoted as virtual routing device 170 (VRD 170), whenever call handler 30 determines that the called number, for example, the dialed number identification service (DNIS) information, specifies an ACD application, CPDB 110 comprises call processing tables 140 which are used by call handlers 30 to store status information on the progress of active calls and the readiness of internal destination devices. At that time, VRD 170 places the incoming call into VRD call queue 120 of CPDB 110 and transmits a call-received event message to software module ACD Route Manager 160 (ARM 160). In response to the call-received event message, ARM 160 obtains routing information for the incoming call and sends a route request to VRD 170. Note that this is different from the prior art which includes a delay in call processing to provide an opportunity for a host routing application running on host processors 80 to provide another route request. VRD call queue 120 queues incoming calls which are waiting to be routed to a final destination. ARM 160 determines routing information for incoming calls placed in VRD call queue 120 of CPDB 110 in a manner which is well known by using predetermined routing commands or steps stored in ACD routing tables 130 of CPDB 110. ACD routing tables 130 are comprised of sequential routing commands or steps which determine the routing of incoming calls for the ACD application. VRD 170 generates connections between incoming calls and both internal and external destinations in response to the routing information received along with the route request from ARM 160 in a manner which is well known to those of ordinary skill in the prior art. As is well known, a destination to which an incoming call may be routed is a temporary destination such as a music or announcement device, or a final destination such as an internal extension, an external extension or an agent (for example, an attendant, a voice mail system, etc.).

As shown in FIG. 1, CP 20 further comprises a software module referred to as application connectivity link 150 (ACL 150). VRD 170 performs several reporting functions by transmitting the following types of information to the host muting applications through ACL 150: (a) call status information from one or more of the software modules of CP 20, including ARM 160, and (b) routing decisions made by VRD 170. ACL 150, on the other hand, performs several reporting functions by transmitting information from the host routing applications to one or more of the software modules of CP 20, including route requests which are generated by the host routing applications running on host computers 80 and are transmitted to VRD 170. As is known in the art, ACL 150 transmits the call status information to external host computers 80 through processor bus 60, server processors 50, and gateway interfaces 70. In response to the call status information, among other things, host routing applications generate route requests. The routing requests are transmitted to ACL 150 through gateway interfaces 70, server processors 50, and processor bus 60. Of course, as is known in the art, the route requests can also be generated by server processors 50 serving in the capacity of an external host computer.

In a preferred embodiment of the present invention, PBX 1000 comprises a 9006 PBX system sold by Siemens Rolm Communications Inc. of Santa Clara, Calif., and host computers 80 preferably comprise a computer system having call monitoring and routing software (otherwise referred to as host-specific applications) stored within their memory. In the embodiment shown in FIG. 1, communication between host computers 80 and processor bus 60 is performed by gateway interface 70 under the control of a host manager software module (no shown) of server processors 50. The host manager software module places received messages into a proper communications format for the receiving agents (either ACL 150 or host computers 80) in accordance with a well-known CSTA protocol communications standard.

In accordance with the preferred embodiment of the present invention, VRD call queue 120 comprises table locations to which each incoming call is assigned along with the following information: (a) a table index for identifying table entries; (b) a status field which contains information on the current state of the incoming call; (c) a route requester identification field which identifies either ARM 160 or a host routing application running on one of host computers 80; and (d) a temporary destination field which identifies any temporary connection for the incoming call. In accordance with a preferred embodiment of the present invention, the call-received event message transmitted to ARM 160 by VRD 170 comprises: (a) an index number of a table entry in VRD call queue 120 which identifies the incoming call; (b) a route control group number (RCG number) for the incoming call which is an index to determine a routing table in ACD routing tables 130; and (c) a time stamp indicating the time the incoming call was received by VRD 170.

Upon receipt of the call-received event message from VRD 170, ARM 160 determines routing information for the incoming call based on predetermined routing steps (i.e. an algorithm of routing commands) stored in ACD routing tables 130. As is well known in the art, ARM 160 does this by using the RCG number of the incoming call to locate the sequential routing steps within ACD routing tables 130. As this is being done, VRD 170 waits for a route request from either or both of ARM 160 and a host routing application running on host computers 80. Note that in accordance with the present invention, route requests may be received from more than one host routing application. Also note that, in this contex, the term host routing application includes routing applications which could also be nm on server processors 50.

In accordance with the present invention, whenever a route request generated by a host routing application is received by ACL 150, ACL 150 performs several checks: (a) it validates the request (for example, has the proper format, relates to an existing incoming call, and so forth) and (b) it determines whether the corresponding incoming call is in a state that can be routed. If one of these checks fails, ACL 150 stops processing the route request and sends a message with an appropriate negative acknowledgment back to the host routing application. If all checks are completed successfully, ACL 150 reformats and transmits the route request to VRD 170. The route request causes VRD 170 to initiate a connection between the incoming call and the destination specified in the route request.

As one can appreciate from the above, route requests from host routing applications are generated in response to monitoring information received from VRD 170, which monitoring information was sent to VRD 170 from ARM 160 and call handlers 30, whereas route requests from ARM 160 are generated in response to call-received event messages received from VRD 170. Each route request transmitted to VRD 170 (whether from ARM 160 or host routing applications) comprises the following information: (a) the table index of the incoming call to be routed; (b) the route destination requested; and (c) a requester identification number identifying the source of the request (ARM 160 or a host routing application).

Once received by VRD 170, a route request received from a host route application is compared against any potentially active route request received from ARM 160 (to either a temporary or final destination) to determine which requesting source has priority. In order to prevent Contention over which destination the incoming call should transferred to when multiple route requests are received by VRD 170, in accordance with the present invention, a priority scheme is utilized. The priority scheme gives priority to route requests received from ARM 160 for a final destination. Thus, if a route request is received from the host routing application after a route request is received from ARM 160, the route request from ARM 160 will prevail. In addition, if a route request from ARM 160 is received after a route request is received from a host routing application, the route request from ARM 160 will prevail unless the route request from the host routing application was completed to a final destination. In accordance with the present invention, a route is considered to be complete when the destination device acknowledges the call.

However, if the route request from ARM 160 is only for a temporary destination and the route request from a host routing application is for a final destination, both route requests will be handled simultaneously (regardless of which route request was first received) until the incoming call is routed to a final destination specified either by the pending route request from the host routing application or a subsequently received route request received from ARM 160. For example, if a route request from ARM 160 for a final destination is received by VRD 170 during a routing attempt for a final destination specified by a route request from a host routing application, the route request from the host routing application will be aborted and processing of the route request from ARM 160 will begin. However, if the route request from ARM 160 is only for a temporary destination such as an announcement or music, both route requests will be processed simultaneously until the final destination specified by the mute request from the host routing application accepts the call made by VRD 170, at which time, the incoming call will be transferred from its temporary destination to the final destination specified by the route request from the host routing application. If a route request is found by VRD 170 not to have priority over another pending route request, the requesting source is informed by VRD 170 that the route request has been rejected.

To process a route request, VRD 170 instructs call handlers 30 to connect the incoming call to the destination specified in the route request. Call handlers 30 can either reject the connection request immediately or can accept the connection request (a connection request may be rejected, for example, because the device has initiated a call). According to the preferred embodiment of the present invention, if a connection request based on a route request from ARM 160 is accepted by call handlers 30, no response is sent to ARM 160. However, if the connection request based on a route request from ARM 160 is not accepted by call handlers 30, VRD 170 sends a negative acknowledgment response to ARM 160. If the connection request based on a route request from ARM 160 is accepted by call handlers 30 land the connection is successfully completed (i.e., the final destination device accepts the outgoing call and it is connected with its corresponding incoming call), VRD 170 sends a positive acknowledgment response to ARM 160. The positive acknowledgment response indicates that the incoming call was successfully completed status and that the incoming call was released from VRD call queue 120. Call processing for the incoming call is now complete. If the connection request based on a route request from ARM 160 is accepted by call handlers 30 and the connection is not successfully completed, VRD 170 sends a negative acknowledgment response to ARM 160 which indicates the reasons foe the failure. In this case, ARM 160 will proceed with alternative routing.

According to the preferred embodiment of the present invention, if a connection request based on a route request from a host routing application is accepted or rejected by call handlers 30, VRD 170 sends a positive or a negative acknowledgment response, respectively, to the host routing application. If the connection request based on a route request from a host routing application is accepted by call handlers 30, VRD 170 sends no acknowledgment response to the host routing application. The host routing application will later be informed of the completion status, successful or not, of the route request in an event monitoring message transmitted to the host routing application during normal event monitoring. If a connection request based on a route request from a host routing application is successfully completed, VRD 170 sends a message to ARM 160 to cause ARM 160 to abandon routing attempts.

Embodiments 0f the present invention will be described with respect to the following scenarios of route transactions to provide a better understanding of the present invention. For simplicity, the operation of ACL 150 is not described in the examples below.

In a first route transaction scenario, an incoming call is received by VRD 170 and entered into VRD call queue 120 of CPDB 110. VRD 170 sends a call-received event message to ARM 160. ARM 160 sends a route request for a temporary destination, an announcement. In response, VRD 170 makes a connection request to call handlers 30. Call handlers 30 accepts the connection request and connects the incoming call to the temporary destination. As was described above, once the incoming call has been connected to the temporary destination, VRD 170 sends a positive acknowledgment response to ARM 160. At some later time, ARM 160 sends a route request to VRD 170 to route the incoming call to a final destination D1 in accordance with predetermined steps in ACD Routing Tables 130. VRD 170 makes a connection request to call handlers 30. Call handlers 30 attempts to make a connection to the final destination D1. As was described above, once the incoming call has been connected to the final destination D1, VRD 170 sends a positive acknowledgment response to ARM 160 and removes the incoming call from VRD call queue 120.

After the incoming call is connected to the final destination D1, call handlers 30 sends, through VRD 170 and ACL 150, an event monitoring message to the host routing application. The event monitoring message contains information regarding the processing and completion status of the route request. Such event monitoring messages are sent to the host routing application for all calls, regardless of whether the route request is generated by ARM 160 or the host application. The monitoring information sent to the host muting application for the route transaction described above comprises information regarding the routing actions undertaken, the event type (in this case, that it was a request to route an incoming call), the host routing application ID identifying the specific requesting source, a time stamp indicating the time at which the incoming call was entered into VRD call queue 120, the RCG number of the call, the calling party (or incoming caller) ID, the destination to which the incoming call was routed (or attempted), and the number of the routing step of ACD Routing Tables 130 last acted upon by ARM 160. In the case of a routing request from a host routing application, the routing step is set to zero.

In a second route transaction scenario, we have the same routing transaction scenario described above except that here a host routing application issues a route request to route the incoming call to a final destination D2 after VRD 170 receives a route request from ARM 160 to route the call to the final destination D1. Under these circumstances, VRD 170 gives priority to the route request from ARM 160 and rejects the route request from the host routing application. Then, VRD 170 sends a negative acknowledgment response to the host routing application to inform it that its request has been rejected.

In a third route transaction scenario, an incoming call is received by VRD 170 and entered into VRD call queue 120 of CPDB 110. VRD 170 sends a call-received event message to ARM 160. ARM 160 sends a route request for a temporary destination, an announcement. In response, VRD 170 makes a connection request to call handlers 30. Call handlers 30 accepts the connection request and connects the incoming call to the temporary destination. As was described above, once the incoming call has been connected to the temporary destination, VRD 170 sends a positive acknowledgment response to ARM 160. After the incoming call has been connected to the temporary destination, a route request to route the incoming call to a final destination D1 is sent to VRD 170 from the host routing application. Upon receipt of the route request from the host routing application, VRD 170 makes a connection request to call handlers 30 and call handlers 30 accepts the connection request. VRD 170 then sends a positive acknowledgment response to the host routing application. Upon acceptance of the connection by the final destination D1, call handlers 30 informs VRD 170 thereof. In response, VRD 170 dequeues the incoming call from VRD call queue 120 and sends a message to ARM 160 to inform it that the incoming call has been connected (this last step prevents ARM 160 from further processing the incoming call).

In a fourth route transaction scenario, an incoming call is received by VRD 170 and entered into VRD call queue 120 of CPDB 110. VRD 170 sends a call-received event message to ARM 160. ARM 160 sends a route request for a temporary destination, an announcement. In response, VRD 170 makes a connection request to call handlers 30. Call handlers 30 accepts the connection request and connects the incoming call to the temporary destination. As was described above, once the incoming call has been connected to the temporary destination, VRD 170 sends a positive acknowledgment response to ARM 160. After the incoming call has been connected to the temporary destination, a route request to route the incoming call to a final destination D1 is sent to VRD 170 from the host routing application. Upon receipt of the route request from the host routing application, VRD 170 makes a connection request to call handlers 30 and call handlers 30 accepts the connection request. VRD 170 then sends a positive acknowledgment response to the host routing application. However, before the final destination D1 is able to accept the connection, ARM 160 sends a route request to VRD 170 to route the incoming call to another final destination D2. Under these circumstances, VRD 170 immediately checks its priority logic and determines that the route request by ARM 160 is of a higher priority, and aborts the connection request to final destination D1 and makes a connection request to final destination D2. Once the connection request has been accepted by final destination D2, VRD 170 sends a positive acknowledgment response to ARM 160. In this scenario, the host routing application is not made aware of the cancellation of the route request to final destination D1. Subsequent event monitoring messages sent by call handlers 30 and/or VRD 170 to the host routing application will cause the host routing application to update the completion status of the incoming call.

Those skilled in the art will recognize that the foregoing description has been presented for the sake of illustration and description only. As such, it is not intended to be exhaustive or to limit the invention to the precise form disclosed. For example, it should be understood that the present invention is not limited to the particular priority scheme described in detail above and that alternate priority schemes may be used as well.

What is claimed is:

1. A method for dynamically routing incoming calls through a private branch exchange (PBX), which method comprises the steps of:

receiving an incoming call;

receiving an internal route request from a call processing module of the PBX in response to receiving the incoming call;

receiving an external route request for the incoming call from an alternate source outside of the PBX; and rejecting the internal or the external route request on the basis of a priority scheme.

2. The method of claim 1 wherein the call processing module is an automatic call distribution routing module.

3. The method of claim 2 wherein the alternate source comprises at least one external host computer.

4. The method of claim 2 wherein the alternate source comprises a server processor associated with the PBX.

5. The method of claim 1 wherein the priority scheme allows resolution of a conflict between an internal and an external route request before the incoming call is connected to a final destination.

6. The method of claim 5 wherein the priority scheme assigns a higher priority to an internal route request than it assigns to an external route request.

7. A method for dynamically routing incoming calls through a private branch exchange (PBX), which method comprises the steps of:

receiving an incoming call;

receiving an internal route request from a call processing module of the PBX in response to receiving the incoming call;

receiving an external route request for the incoming call from an alternate source outside of the PBX;

establishing a priority scheme for connecting the incoming call in response to one of the internal and external route requests, including allowing resolution of a conflict between the internal and external route requests before the incoming call is connected to a final destination and including allowing the incoming call to be connected to one or more temporary destinations without consideration of a conflict between the internal and external route requests; and rejecting the internal or the external route request on the basis of the priority scheme.

\* \* \* \* \*